Patented May 20, 1952

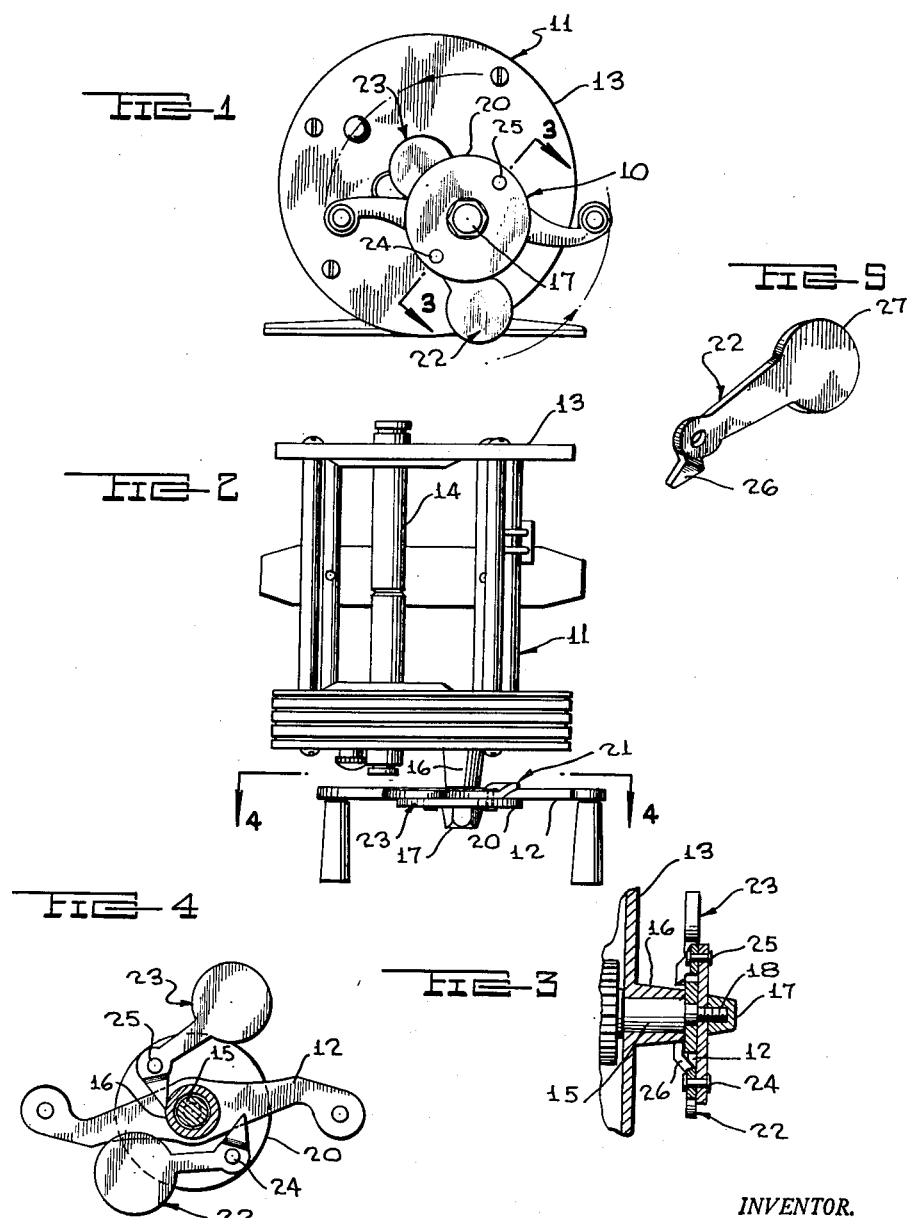

2,597,486

UNITED STATES PATENT OFFICE 2,597,486

AUTOMATIC GOVERNOR ATTACHMENT FOR FISHING REELS

Chester L. Hockney, Silverlake, Wis.

Application September 29, 1950, Serial No. 187,607

2 Claims. (Cl. 242—84.5)

This invention relates to fishing reel braking devices, and more particularly to an automatic governor attachment for a fishing reel.

An object of this invention is to provide a governor attachment which is particularly adapted for connection to any one of a plurality of different fishing reels.

Another object of this invention is to provide a casting governor attachment for a fishnig reel adapted to automatically apply a braking force to the crank of the fishing reel at the beginning of a cast, to thereby effectively prevent the reel from overrunning and causing the line being cast to become snarled and tangled.

A further object of this invention is to provide a fishing reel governor attachment for use in casting which is particularly adapted to prevent backlash, yet does not effectively decrease the length of the cast.

A still further object of this invention is to provide an automatic governor attachment for a fishing reel which is relatively simple in structure and cheap to manufacture.

The above and still further objects and advantages of the invention will become apparent from a consideration of the following detailed description of the invention, when taken in conjunction with the accompanying drawings, wherein:

Figure 1 is a side elevational view of the automatic governor attachment of the present invention, shown supported on the crankshaft of a fishing reel;

Figure 2 is a top plan view of the assembly of the governor attachment and fishing reel shown in Figure 1;

Figure 3 is an enlarged sectional view taken along the line 3—3 of Figure 1;

Figure 4 is a sectional view taken along the line 4—4 of Figure 2; and

Figure 5 is a perspective view of one of the brake arms forming the automatic governor attachment of the present invention.

When casting, the crank of the rotary line-supporting reel effectively operates as a flywheel, and results in overrunning of the reel and consequent snarling and tangling of the fishing line. The application of a braking force, such as by thumbing, requires long experience and makes it virtually impossible for an inexperienced fisherman to avoid backlashing, while the experienced fisherman is subjected to the cutting action due to the constant contact of the thumb with the line being cast. Constant tension braking devices have been employed, but effectively decrease the length of cast obtained, and do not completely prevent backlash.

The automatic reel governor of the present invention, generally designated by the reference numeral 10, obviates the aforementioned difficulties by applying a braking force to the crank 12 of a fishing reel 11, which is proportional to the speed of rotation of the reel and is effectively applied only at the beginning of a cast. The fishing reel 11, which forms no part of the present invention, embodies a reel frame 13 in which is rotatably journaled a reel 14. The reel 14 is driven by a crankshaft 15 which is operatively connected to the reel 14 and is journaled in a crankshaft bearing 16 which projects from one side of the reel frame 13. One end of the crankshaft 15 projects beyond the bearing 16 and carries the crank 12, the securement being effected by means of a nut 17 which is engaged about the adjacent threaded end 18 of the shaft 15, as clearly shown in Figure 3.

The attachment 10 of the present invention embodies a plate 20 which is adapted to be secured transversely of the crankshaft 15 contiguous to and exteriorly of the crank 12. Operatively connected to the plate 20 and engageable with the shaft bearing 16 is a centrifugal actuated braking means, generally designated by the reference numeral 21 for applying a braking force to the reel 14 proportional to the speed of rotation of the reel, to thereby effectively prevent backlash of the reel.

The centrifugal actuated braking means 21 embodies at least a pair of brake arms 22, 23, Figures 4 and 5, each being pivotally mounted intermediate its ends at opposed points on the plate 20 by means of the rivets 24, 25. Since the structure of each of the brake arms 22, 23 is the same, it will suffice to describe only one in detail. In Figure 5 there is shown one of the brake arms, which has one end laterally offset, as indicated by the reference numeral 26, for extension behind the adjacent portion of the crank 12 to a position contiguous to the outer periphery of the crankshaft bearing 16. The other end of the brake arm 22 is enlarged and weighted, as indicated by the reference numeral 27, to thereby counterbalance the arm 22 for frictional engagement with the outer periphery of the crankshaft bearing 16 upon the rotary movement of the assembly of the crankshaft 15 and the pivotally supported brake arms 22, 23 carried on the plate 20.

In actual use, the attachment 10 of the present invention can be applied to a fishing reel 11 by removing the nut 17 from the threaded end 18 of the crankshaft 15, whereupon the plate 20 carrying the weighted brake arms 22, 23 can be supported exteriorly of the crank 12 and transversely of the crankshaft 15 with the offset ends 26 of the arms in position for frictional engagement with the outer periphery of the crankshaft bearing 16. The nut 17 is then once again engaged upon the threaded end of the shaft 15 to thereby non-rotatably support the plate 20 on the shaft 15. Since the braking force is applied to the crank-shaft 15 only at the beginning of a cast, the breaking force being proportional to the speed of rotation of the crankshaft, backlash is effectively prevented without decreasing the length of the cast. By properly selecting the weighting of the brake arms 22, 23, a braking force can be applied to the crankshaft 15 only at the beginning of the cast when the crank 12 of the reel 11 effectively operates as a flywheel and results in the over-running of the reel and the consequent snarling and tangling of the line.

Although only one embodiment of the automatic fishing reel governor attachment of the present invention has been described, it is readily apparent that numerous modifications can be made without departing from the spirit of the invention as set forth in the appended claims.

What I claim is:

1. A governor attachment for connection to a rotary fishing reel including a reel frame plate carrying a crankshaft bearing, a crankshaft rotatably journaled within said bearing and having one end projecting exteriorly of the latter, and a crank positioned transversely of said crankshaft and secured to said one end thereof, said attachment comprising a plate adapted to be secured on said crankshaft contiguous to and exteriorly of said crank, and means including opposed brake arms disposed between said reel frame plate and said crank and each pivotally connected intermediate its ends to said plate, one end portion of each arm being adapted for engagement with said crankshaft bearing and the other end portion of each arm being weighted and engageable with the adjacent portion of said crank for applying a braking force to said rotary fishing reel by a centrifugal action to thereby prevent backlash of said fishing reel.

2. A governor attachment for connection to a rotary fishing reel including a crankshaft bearing, a crankshaft rotatably journaled within said bearing and having one end projecting exteriorly of the latter, and a crank positioned transversely of said crankshaft and secured to said one end thereof, said attachment comprising a plate adapted to be secured on said crankshaft contiguous to and exteriorly of said crank, and means operatively connected to said plate and engageable with said shaft bearing for applying a braking force to said rotary fishing reel proportional to the speed of rotation of the latter to thereby prevent backlash of said fishing reel, said means comprising at least a pair of brake arms each pivotally mounted intermediate its ends at opposed points on said plate, one end of each of said arms being laterally offset for extension behind the adjacent portion of said crank to a position contiguous to the outer periphery of said crankshaft bearing, and the other end of each of said arms being enlarged and weighted to thereby counter-balance said arms for frictional engagement with said outer periphery of said crankshaft bearing upon the rotary movement of said fishing reel.

CHESTER L. HOCKNEY.

REFERENCES CITED

The following references are of record in the file of this patent:

UNITED STATES PATENTS

| Number | Name | Date |
| --- | --- | --- |
| 2,290,662 | Willison | July 21, 1942 |